(12) United States Patent
Kim et al.

(10) Patent No.: US 7,006,187 B2
(45) Date of Patent: Feb. 28, 2006

(54) ARRAY SUBSTRATE FOR IN-PLANE SWITCHING MODE LIQUID CRYSTAL DISPLAY DEVICE AND METHOD OF FABRICATING THE SAME

(75) Inventors: Do-Sung Kim, Gyeonsangbuk-do (KR); Do-Yeon Kim, Busangwangyeok-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 93 days.

(21) Appl. No.: 10/742,989

(22) Filed: Dec. 23, 2003

(65) Prior Publication Data

US 2004/0135954 A1   Jul. 15, 2004

(30) Foreign Application Priority Data

Dec. 30, 2002  (KR)  ...................... 10-2002-0086521

(51) Int. Cl.
*G02F 1/1343* (2006.01)
(52) U.S. Cl. ..................................................... 349/141
(58) Field of Classification Search ................. 349/141
See application file for complete search history.

(56) References Cited

U.S. PATENT DOCUMENTS

| | | | |
|---|---|---|---|
| 5,598,285 A | 1/1997 | Kondo et al. | |
| 5,745,207 A | 4/1998 | Asada et al. | |
| 5,838,037 A | 11/1998 | Masutani et al. | |
| 5,946,060 A | 8/1999 | Nishiki et al. | |
| 5,990,987 A | 11/1999 | Tanaka | |
| 6,028,653 A | 2/2000 | Nishida | |
| 6,097,454 A | 8/2000 | Zhang et al. | |
| 6,803,979 B1 * | 10/2004 | Yoo et al. | ...................... 349/84 |

FOREIGN PATENT DOCUMENTS

| | | |
|---|---|---|
| JP | 9-5764 | 1/1997 |
| JP | 9-73101 | 3/1997 |
| JP | 9-101538 | 4/1997 |
| JP | 9-105908 | 4/1997 |

OTHER PUBLICATIONS

R. Kiefer, et al. "In-Plane Switching of Nematic Liquid Crystals." *Japan Display.* 1992, pp. 547-549.

(Continued)

*Primary Examiner*—James A. Dudek
(74) *Attorney, Agent, or Firm*—McKenna Long & Aldridge LLP

(57) ABSTRACT

An array substrate for an in-plane switching liquid crystal display device includes a plurality of gate lines and data lines on a substrate, a plurality of thin film transistors, each thin film transistor disposed at a crossing of the gate and data lines and includes a gate electrode, an active layer, a source electrode, and a drain electrode, a plurality of common lines formed parallel with the gate lines on the substrate, a plurality of common electrodes linearly extending from each of the common lines into pixel regions; a plurality of pixel electrodes within each of the pixel regions, each of the pixel electrodes disposed between and parallel with the common electrodes, a first plurality of organic patterns formed along the common electrodes on opposing right and left sides of each of the common electrodes; and a second plurality of organic patterns formed along the pixel electrodes on opposing right and left sides of each of the pixel electrodes.

16 Claims, 10 Drawing Sheets

OTHER PUBLICATIONS

M. Oh-E, et al. Principles and Characteristics of Electro-Optical Behaviour With In-Plane Switching Mode. *Asia Display*. 1995, pp. 577-580.

M. Ohta, et al. "Development of Super TFT-LCDs With In-Plane Swithching Display Mode." *Asia Display*. 1995, pp. 707-710.

S. Matsumoto, et al. "Display Characteristics of In-Plane-Switching (IPS) LCDs and A Wide-Viewing-Angle 14.5 in. IPS TFT-LCD." *Euro Display*. 1996, pp. 445-448.

H. Wakemoto, et al. "An Advanced In-Plane-Switching Mode TFT-LCD." *SID Digest*. 1997, pp. 929-932.

S.H. Lee, et al., "High Transmittance, Wide-Viewing-Angle Nematic Liquid Crystal Display Controlled by Fringle-Field Switching." *Asia Display*. 1998, pp. 371-374.

S. Endoh, et al. "Advanced 18.1-inch Diagonal Super-TFT-LCDs with Mega Wide Viewing Angle and Fast Response Speed of 20ms." *IDW*. 1999, pp. 187-190.

* cited by examiner

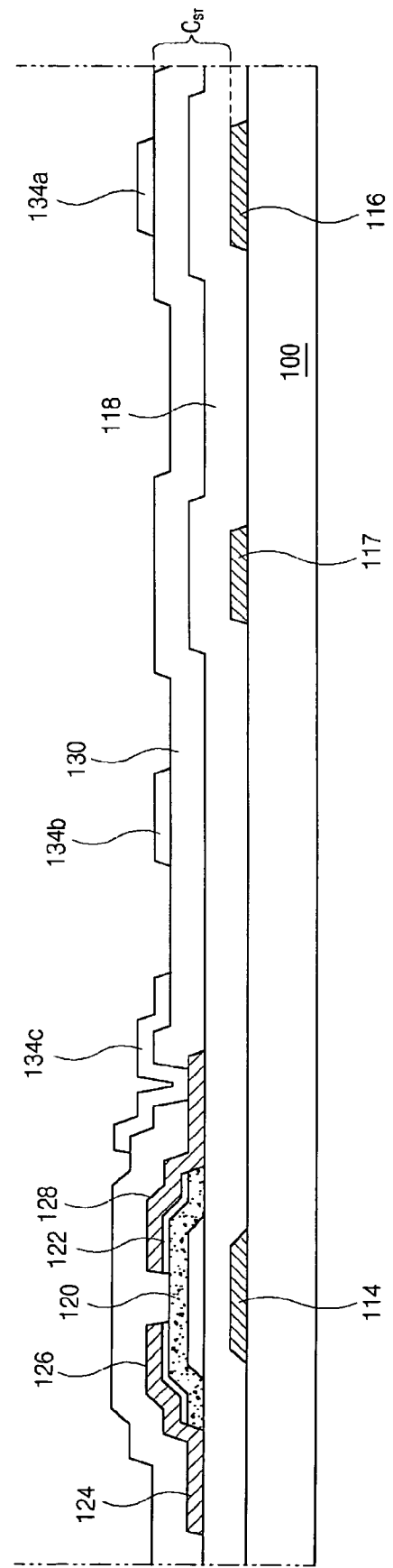

ARRAY SUBSTRATE FOR IN-PLANE SWITCHING MODE LIQUID CRYSTAL DISPLAY DEVICE AND METHOD OF FABRICATING THE SAME

The present invention claims the benefit of Korean Patent Application No. 2002-0086521, filed in Korea on Dec. 30, 2002, which is hereby incorporated by reference.

BACKGROUND OF THE INVENTION

1. Field of the Invention

The present invention relates to liquid crystal display devices, and more particularly, to an implenting in-plane switching (IPS) liquid crystal display device.

2. Discussion of the Related Art

In general, a liquid crystal display device makes use of optical anisotropy and polarization properties of liquid crystal molecules to produce an image, wherein the liquid crystal molecules have an initial alignment direction due to their long, thin shape. In addition, the alignment direction can be controlled by inducement of an electric field, wherein the alignment direction of the liquid crystal molecules changes as the induced electric field changes. Thus, refraction of incident light is dependent upon the alignment direction of the liquid crystal molecules due to the optical anisotropy properties of the liquid crystal molecules. Therefore, images can be produced by properly controlling the induced electric field.

Of the different types of known liquid crystal display (LCD) devices, active matrix LCD (AM-LCDs) devices, which have a matrix configuration of thin film transistors (TFTs) and pixel electrodes, are presently being development because of their high resolution and superiority in displaying moving images. The LCD devices have wide application in office automation (OA) equipment and video devices because of their light weight, thin profiles, and low power consumption characteristics. Commonly, a liquid crystal display panel has an upper substrate, a lower substrate, and a liquid crystal layer interposed therebetween. The upper substrate is commonly referred to as a color filter substrate, and usually includes a common electrode and color filters. The lower substrate is commonly referred to as an array substrate, and includes switching elements, such as thin film transistors and pixel electrodes.

As previously described, when the alignment direction of the liquid crystal molecules is properly adjusted, incident light is refracted along the alignment direction to display image data. Thus, the liquid crystal molecules function as an optical modulation element having variable optical characteristics that are dependent upon a polarity of a voltage applied to the common electrode and the pixel electrode. Accordingly, since the pixel and common electrodes are positioned on the lower and upper substrates, respectively, the electric field induced between them is perpendicular to the lower and upper substrates. However, the LCD devices having longitudinal electric fields are disadvantageous since they have a very narrow viewing angle. In order to solve the problem of narrow viewing angle, in-plane switching liquid crystal display (IPS-LCD) devices have been proposed. The IPS-LCD device commonly includes a lower substrate, which has a pixel electrode and a common electrode disposed thereon, an upper substrate having no electrode, and a liquid crystal interposed between the upper and lower substrates.

FIG. 1 is a schematic cross sectional view of an IPS-LCD panel according to the related art. In FIG. 1, upper and lower substrates 10 and 20 are spaced apart from each other, and a liquid crystal layer 40 is interposed therebetween. On the lower substrate 20 are a common electrode 36 and a pixel electrode 38, wherein the common and pixel electrodes 36 and 38 are aligned parallel to each other. On a surface of the upper substrate 10, a color filter layer (not shown) is positioned corresponding to an interval between the pixel electrode 38 and the common electrode 36 of the lower substrate 20. A voltage applied across the common and pixel electrodes 36 and 38 produces an electric field 21 through the liquid crystal layer 40. Since the liquid crystal layer 40 has a positive dielectric anisotropy, liquid crystal molecules of the liquid crystal layer 40 align parallel to the electric field 21.

FIGS. 2A and 2B are schematic cross sectional views of an IPS-LCD device according to the related art. As shown in FIG. 2A, when no electric field is produced by the common and pixel electrodes 36 and 24, i.e., an OFF state, longitudinal axes of liquid crystal (LC) molecules 42 are parallel and form a definite angle with the common and pixel electrodes 36 and 38. For example, the longitudinal axes of the LC molecules 42 are arranged parallel with both the common and pixel electrodes 36 and 38.

Conversely, as shown in FIG. 2B, when a voltage is applied to the common and pixel electrodes 36 and 38, i.e., an ON state, an in-plane electric field 21 parallel to the surface of the lower substrate 20 is produced because the common and pixel electrodes 36 and 38 are on the lower substrate 20. Accordingly, the LC molecules 40 are re-aligned having their longitudinal axes coincidence with (parallel to) the electric field. However, the first LC molecules 40a positioned directly adjacent to the common and pixel electrodes 36 and 38 do not change their alignment, while the second LC molecules 40b positioned between the common and pixel electrodes 36 and 38 are aligned perpendicular to the common and pixel electrodes 36 and 38. Thus, a wide viewing angle is produced ranging from about 80 to 85 degrees along vertical and horizontal directions from a line vertical to the IPS-LCD panel. However, if the common and pixel electrodes 36 and 38 have parallel rectilinear shapes, the IPS-LCD panel produces a color shift phenomenon and/or a gray scale inversion. Thus, the common and pixel electrodes are formed to have a zigzag shape, as shown in FIG. 3.

FIG. 3 is a plan view of an array substrate for an IPS-LCD device according to the related art. In FIG. 3, a gate line 12 including at least one gate electrode 14 is formed along a first direction on a substrate 20, wherein the gate electrode 14 protrudes from the gate line 12. In addition, a data line 24 is disposed substantially perpendicular to the gate line 12 along a second direction, and a common line 16 is arranged parallel with the gate line 12. Accordingly, the gate line 12, the common line 16, and a pair of the data lines 24 define a pixel region P on the substrate 20. Furthermore, an island-shaped semiconductor layer 22 is positioned near the crossing of the gate and data lines 12 and 24, thereby forming a thin film transistor (TFT) T having a source electrode 26 and a drain electrode 28. The gate electrode 14 protruded from the gate line 12 is disposed between the source and drain electrodes 26 and 28, and corresponds to the island-shaped semiconductor layer 22.

As shown in FIG. 3, a plurality of pixel electrodes 30b are disposed within the pixel region P, wherein the plurality of pixel electrodes 30b extend from a pixel connector 30a disposed to overlap the common line 16. In addition, a plurality of common electrodes 17 extending from the common line 16 are also disposed within the pixel region P, wherein each of the common electrodes 17 corresponds to the pixel electrode 30b and also has a zigzag shape. Thus, liquid crystals 63, which have an initial direction in accordance with a rubbing direction, are oriented along electric fields K when electric signals are supplied to the zigzag-shaped common and pixel electrodes 17 and 30b.

In the array substrate shown in FIG. 3, since the common and pixel electrodes 17 and 30b have the same zigzag shape, the pixel region P has multiple domains therein. Accordingly, the liquid crystals in one domain have a symmetrical figure arranged symmetrically to the liquid crystals in second, adjacent domains when the electric fields K are generated. The multiple domain structures described above minimize the color shift phenomenon and suppress the gray scale inversion due to the multiple domains offsetting birefringence within the pixel regions P.

However, the IPS-LCD device shown in FIG. 3 is problematic. For example, since the common and pixel electrodes 17 and 30b have the zigzag shapes, the liquid crystals 63 located near bent portions C of the common and pixel electrodes 17 and 30b are not oriented although the electric signals are supplied to the common and pixel electrodes 17 and 30b. This is due to the electric field generated near the bent portions C being perpendicular to the initial alignment direction formed by rubbing processes. Furthermore, the liquid crystals located in left and right portions D1 and D2 of the pixel region P do not properly respond to the electric field due to the fact that the electric fields generated in the left and right portions D1 and D2 are not suitable enough to twist the liquid crystals 63. For example, the directions of electric fields in the left and right portions D1 and D2 are relatively abnormal as compared with those generated between the common and pixel electrodes 17 and 30b. Therefore, light leakage may occur in the portions D1 and D2, and the disclination may be caused by misalignment of the liquid crystals 63. In other IPS-LCD devices, a black matrix is adopted in order to cloak the disclination and the light leakage, but this may decrease aperture ratios of the IPS-LCD devices.

SUMMARY OF THE INVENTION

Accordingly, the present invention is directed to an array substrate for an in-plane switching mode liquid crystal display device and a method of fabricating an array substrate for in-plane switching mode liquid crystal display device that substantially obviates one or more of the problems due to limitations and disadvantages of the related art.

An object of the present invention is to provide an array substrate for an IPS-LCD device that prevents a color shift phenomenon and a gray scale inversion.

An object of the present invention is to provide a method of fabricating an array substrate for an IPS-LCD device that prevents a color shift phenomenon and a gray scale inversion.

Another object of the present invention is to provide an array substrate for an IPS-LCD device that prevents electric field distortion and disclination.

Another object of the present invention is to provide a method of fabricating an array substrate for an IPS-LCD device that prevents electric field distortion and disclination.

Another object of the present invention is to provide an array substrate for an IPS-LCD device that increases aperture ratio within a pixel region.

Another object of the present invention is to provide a method of fabricating an array substrate for an IPS-LCD device that increases aperture ratio within a pixel region.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a gate line and a data line on a substrate, a thin film transistor at a crossing of the gate line and the data line, the thin film transistor including a gate electrode, an active layer, a source electrode, and a drain electrode, a common line formed parallel with the gate line on the substrate, the common line, the gate line, and the data line defining a pixel region, a plurality of common electrodes extending from the common line into the pixel region, the plurality of common electrodes having a straight line shape, a plurality of pixel electrodes in the pixel region, each of the pixel electrodes disposed between the common electrodes and having a straight line shape, first and second organic patterns formed along the common electrode on opposing right and left sides of the common electrode, and third and fourth organic patterns formed along the pixel electrode on opposing right and left sides of the pixel electrode.

In another aspect, a method of fabricating an array substrate for in-plane switching liquid crystal display device includes forming a gate line and a data line on a substrate, forming a thin film transistor at a crossing of the gate line and the data line, the thin film transistor including a gate electrode, an active layer, a source electrode, and a drain electrode, forming a common line parallel with the gate line on the substrate, the common line, the gate line, and the data line defining a pixel region, forming a plurality of common electrodes extending from the common line into the pixel region, the plurality of common electrodes having a straight line shape, forming a plurality of pixel electrodes in the pixel region, each of the pixel electrodes disposed between the common electrodes and having a straight line shape, forming first and second organic patterns along the common electrode on opposing right and left sides of the common electrode, and forming third and fourth organic patterns along the pixel electrode on opposing right and left sides of the pixel electrode.

In another aspect, an array substrate includes a plurality of gate lines and data lines on a substrate, a plurality of thin film transistors, each thin film transistor disposed at a crossing of the gate and data lines and includes a gate electrode, an active layer, a source electrode, and a drain electrode, a plurality of common lines formed parallel with the gate lines on the substrate, a plurality of common electrodes linearly extending from each of the common lines into pixel regions, a plurality of pixel electrodes within each of the pixel regions, each of the pixel electrodes disposed between and parallel with the common electrodes, a first plurality of organic patterns formed along the common electrodes on opposing right and left sides of each of the common electrodes, and a second plurality of organic patterns formed along the pixel electrodes on opposing right and left sides of each of the pixel electrodes.

In another aspect, a method of fabricating an array substrate includes forming a plurality of gate lines and data lines on a substrate, forming a plurality of thin film transistors at crossings of the gate and data lines, each thin film transistor includes a gate electrode, an active layer, a source electrode, and a drain electrode, forming a plurality of common lines parallel with the gate lines on the substrate, forming a plurality of common electrodes to linearly extend from each of the common lines into pixel regions, forming a plurality of pixel electrodes within each of the pixel regions, each of the pixel electrodes disposed between and parallel with the common electrodes, forming a first plurality of organic patterns along the common electrodes on opposing right and left sides of each of the common electrodes, and forming a second plurality of organic patterns along the pixel electrodes on opposing right and left sides of each of the pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings:

FIGS. 5A to 5F cross sectional views along V—V of FIG. 4 showing an exemplary method of fabricating an array substrate according to the present invention.

DETAILED DESCRIPTION OF THE ILLUSTRATED EMBODIMENTS

Reference will now be made in detail to illustrated embodiments of the present invention, examples of which are shown in the accompanying drawings.

Figure 1:
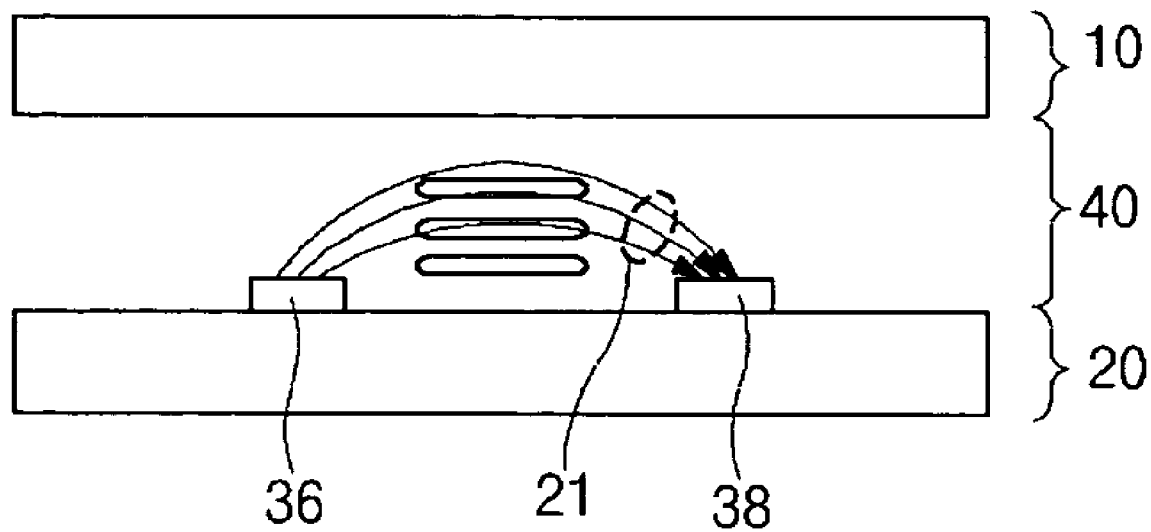
FIG. 1 is a schematic cross sectional view of an IPS-LCD panel according to the related art.
Figure 2A:
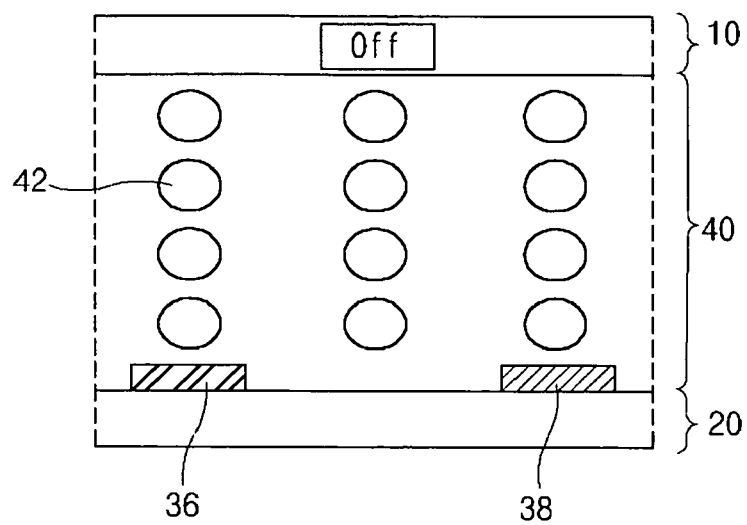
FIGS. 2A and 2B are schematic cross sectional views of an IPS-LCD device according to the related art.
Figure 2B:
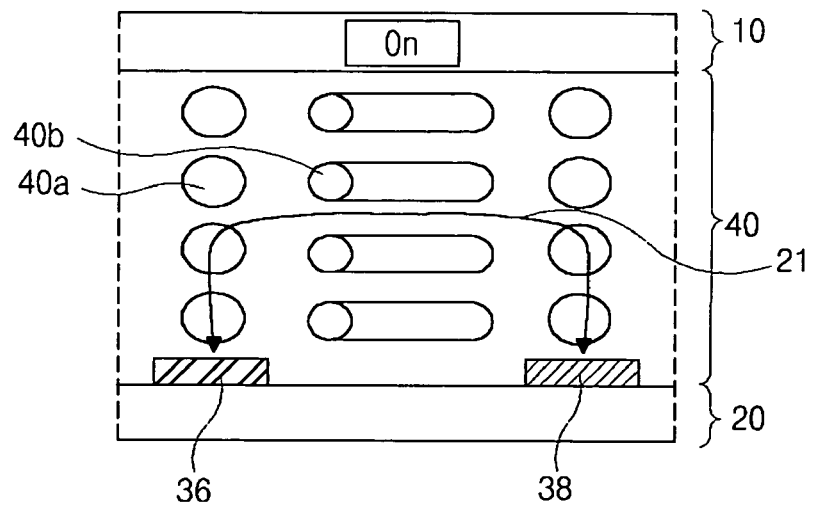
Figure 3:
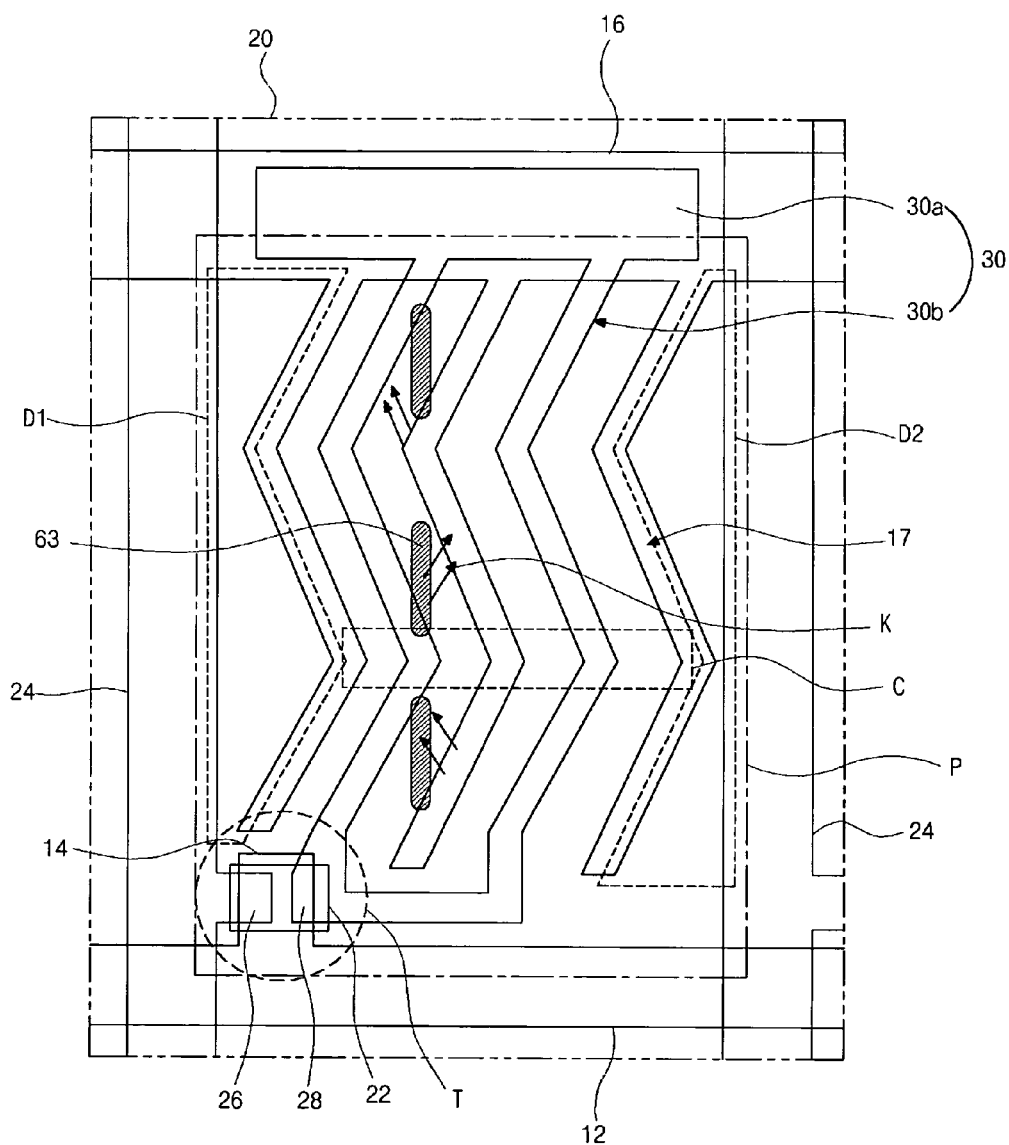
FIG. 3 is a plan view of an array substrate for an IPS-LCD device according to the related art.
Figure 4:
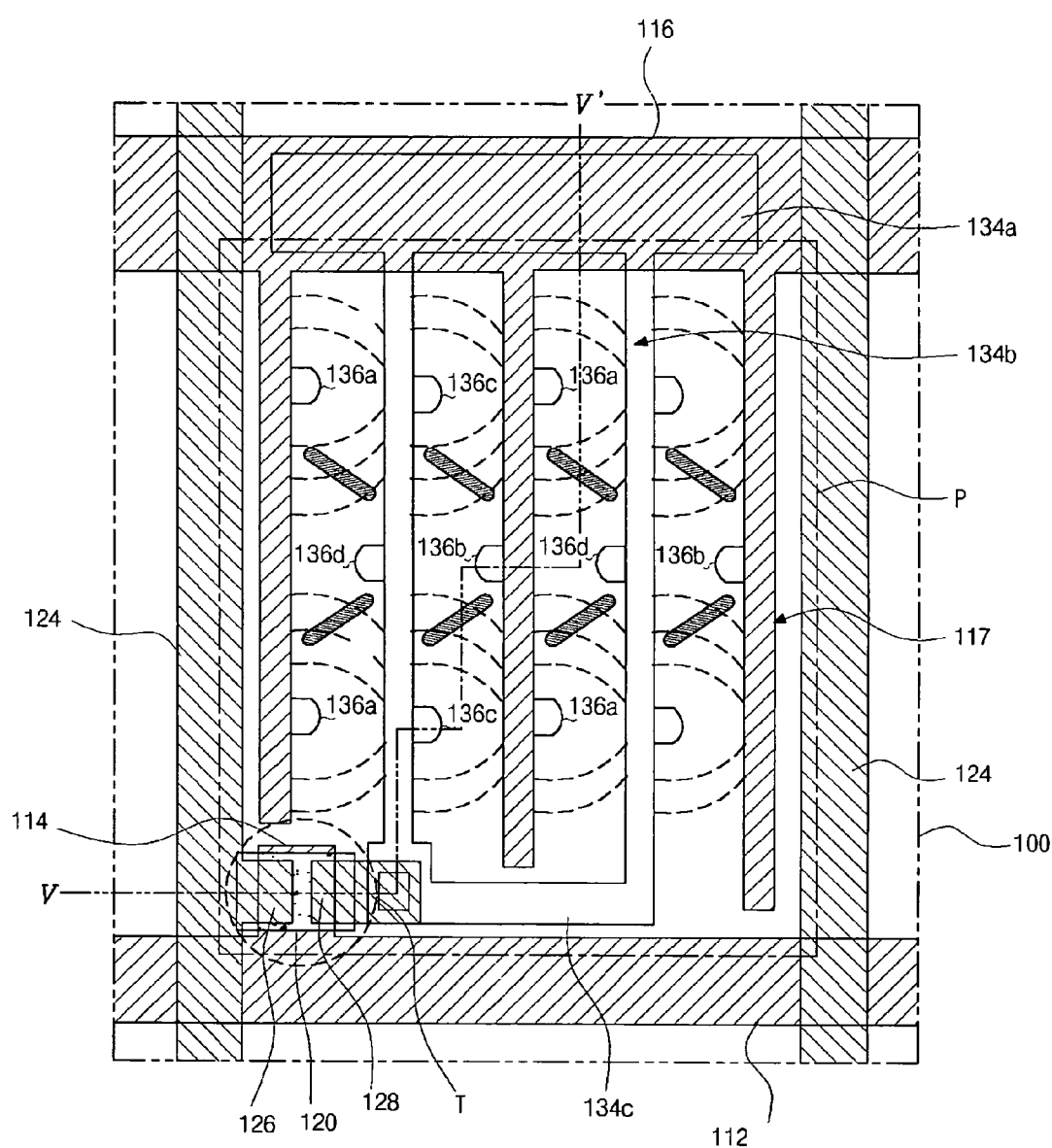
FIG. 4 is a plan view of an exemplary array substrate for an IPS-LCD device according to the present invention.

FIG. 4 is a plan view of an exemplary array substrate for an IPS-LCD device according to the present invention. In FIG. 4, a gate line 112 may extend along a first direction on a substrate 100 (in FIG. 5A), and a common line 116, may be spaced apart from and disposed parallel with the gate lines 112. In addition, a pair of data lines 124 may be spaced apart from each other and may be disposed across and perpendicular to the gate and common lines 112 and 116. Accordingly, the gate line 112, the common line 116, and the pair of data lines 124 may define a pixel region P.

In FIG. 4, a switching device T, i.e., thin film transistor, may be positioned near the crossing of the gate and data lines 112 and 124. The thin film transistor T may include a gate electrode 114, an active layer 120, a source electrode 126, and a drain electrode 128, wherein the gate and source electrodes 114 and 126 may extend from and may be electrically connected with the gate and data lines 112 and 124, respectively. The drain electrode 128 may be spaced apart from the source electrode 126 and may overlap a first end of the gate electrode 114, and the source electrode 126 may also overlap a second end of the gate electrode 114. In addition, an active layer 120 may be located over the gate electrode 114 and under the source and drain electrodes 126 and 128.

In FIG. 4, a plurality of pixel electrodes 134b may be disposed within the pixel region P. A first pixel-connecting line 134a, which may be connected with a first end of each respective pixel electrode 134b, may be disposed to overlap the common line 116. In addition, a second pixel-connecting line 134c, which may be connected with a second end of each respective pixel electrode 134b, may electrically contact the drain electrode 128 through a drain contact hole and may be disposed parallel with and next to the gate line 112. Moreover, a plurality of common electrodes 117 may be disposed parallel with the data line 124 and spaced apart from each other, wherein the plurality of common electrodes 117 may extend from the common line 116, and a first end of each of the common electrodes 117 may be electrically connected to the common line 116. The common electrodes 117 and the pixel electrodes 134b may be parallel with and spaced apart from each other in an alternating pattern, wherein each pixel electrode 134b may correspond to an adjacent common electrode 117. The common and pixel electrodes 117 and 134b may have a straight line shape.

In FIG. 4, a plurality of organic patterns 136 may be formed on sides of the common and pixel electrodes 117 and 134b, wherein first organic patterns 136a may be formed on right sides of each common electrode 117, corresponding to third organic patterns 136c that are formed on right sides of each pixel electrode 134b. In addition, second organic patterns 136b may be formed on left sides of each common electrode 117, corresponding to a fourth organic pattern 136d formed on left sides of each pixel electrodes 134b. The first and second organic patterns 136a and 136b may be disposed in an alternating pattern on the right and left sides of the common electrodes 117, respectively. In addition, the third and fourth organic patterns 136c and 136d may be disposed in an alternating pattern on the right and left sides of the pixel electrodes 134b, respectively. The first, second, third, and fourth organic patterns 136a, 136b, 136c, and 136d may be formed in a same plane as the pixel electrodes 134b so that the third and fourth organic patterns 136c and 136d may contact the pixel electrodes 134b. Since the first and second organic patterns 136a and 136b may be formed in a plane different from the common electrodes 117, the first and second organic patterns 136a and 136b may not contact the common electrodes 117, although they may be formed on left and right sides of each common electrode 117.

When electric signals are supplied to the common and pixel electrodes 117 and 134b, the electric fields may be symmetrically generated against the organic pattern 136. For example, the electric field formed in an upper portion of the organic pattern 136 may be symmetrically opposed to the electric field formed in a lower portion thereof. Thus, the liquid crystal molecules may be symmetrically arranged and distributed in between the common and pixel electrodes 117 and 134b along vertical directions. Therefore, multiple domains may be obtained although the common and pixel electrodes 117 and 134b are formed having straight line shapes. In addition, the color shift phenomenon and the gray scale inversion may be prevented, and reduction of aperture ratio may be prevented.

Figure 5A:
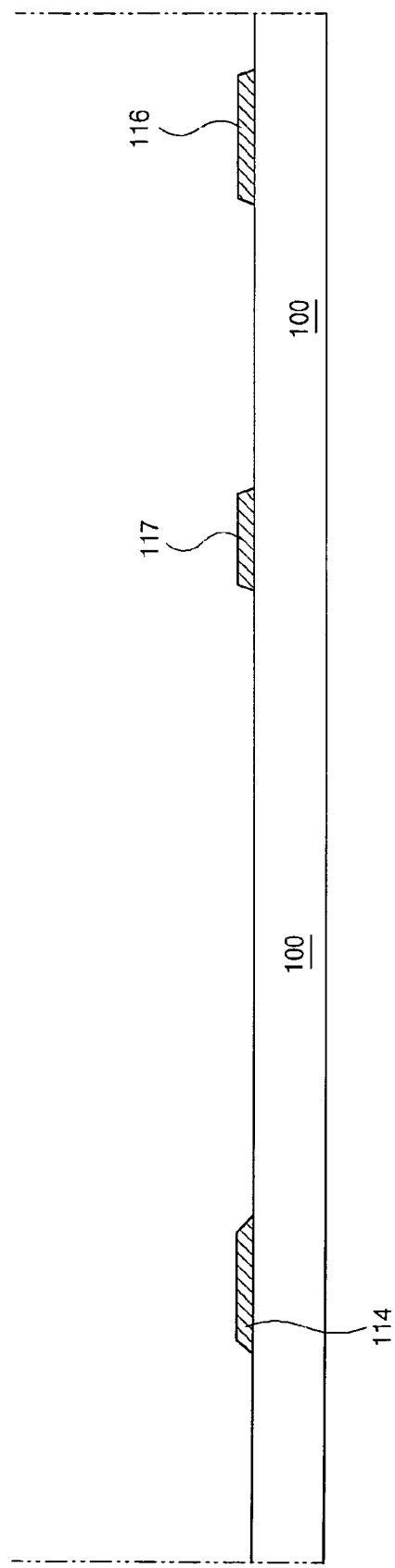

FIGS. 5A to 5F cross sectional views along V—V of FIG. 4 showing an exemplary method of fabricating an array substrate according to the present invention. In FIG. 5A, an opaque metallic material, such as aluminum (Al), aluminum neodymium (AlNd), chromium (Cr), molybdenum (Mo), or tungsten (W), may be deposited on a transparent substrate 100, and patterned using mask processes. such as exposure, development, and etch processes. Thus, the gate line 112 (in FIG. 4), the gate electrode 114, the common line 116, and the common electrode 117 may be formed on the transparent substrate 100.

Figure 5B:
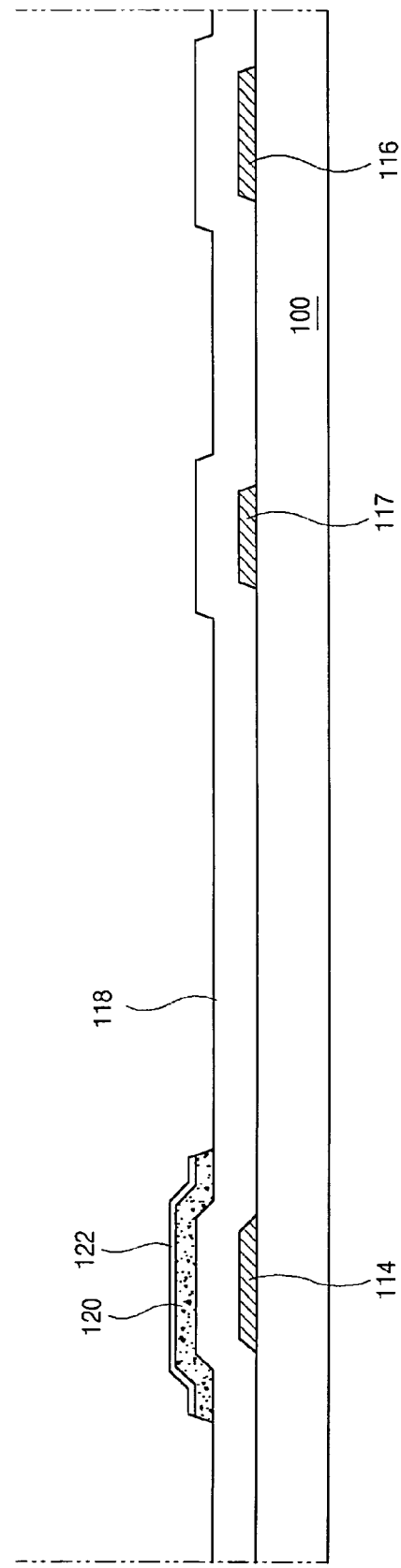

In FIG. 5B, a gate insulation layer 118 may be formed on an entire surface of the transparent substrate 100 to cover the gate line 112, the gate electrode 114, the common line 116, and the common electrode 117. The gate insulation layer 118 may include inorganic material selected from a group consisting of silicon nitride ($SiN_x$) and silicon oxide ($SiO_2$). Then, an amorphous silicon (a-Si) layer and an impurity-doped amorphous silicon layer ($n^+$ a-Si) may be sequentially formed on the gate insulation layer 118. Next, the amorphous silicon (a-Si) layer and the impurity-doped amorphous silicon layer ($n^+$ a-Si) may be patterned using mask processes to simultaneously form an active layer 120 and an ohmic contact layer 122 on the gate insulation layer 118, especially above the gate electrode 114. As shown in FIG. 4, the active layer 120 and the ohmic contact layer 122 may have isolated island shapes.

Figure 5C:
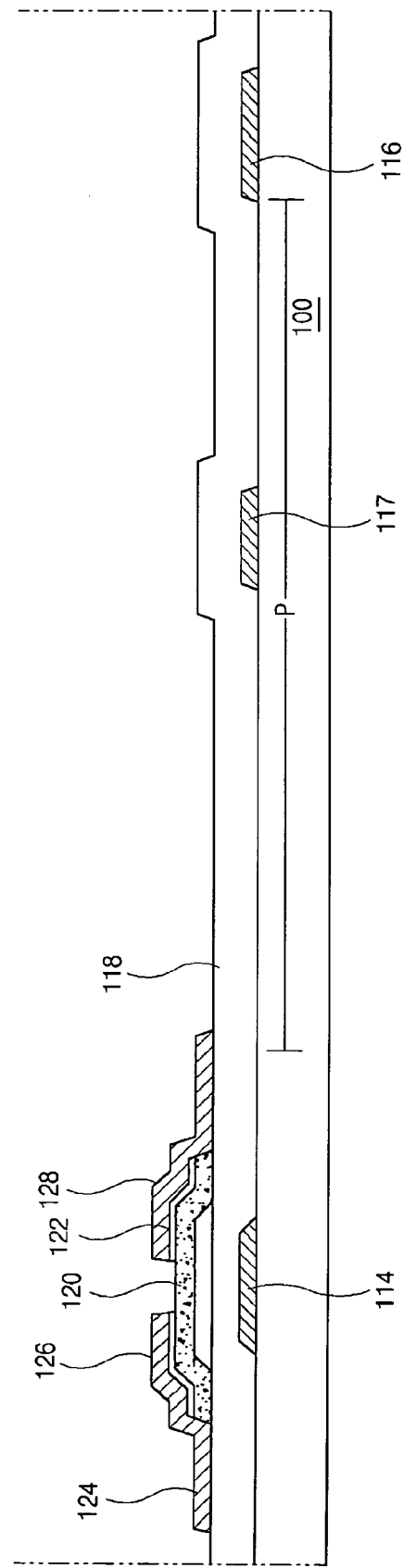

In FIG. 5C, a metallic layer, such as molybdenum (Mo), may be deposited and patterned using mask processes to form the data line 124 (in FIG. 4), the source electrode 126, and the drain electrode 128. Accordingly, the data line 124 may be substantially perpendicular to both the gate line 112 and the common line 116, the source electrode 126 may extend from the data line 124, and the drain electrode 128 may be spaced apart from the source electrode 126. After forming the source and drain electrodes 126 and 128, a portion of the ohmic contact layer exposed between the source and drain electrodes 126 and 128 may be removed using the source and drain electrodes 126 and 128 as masks.

Figure 5D:
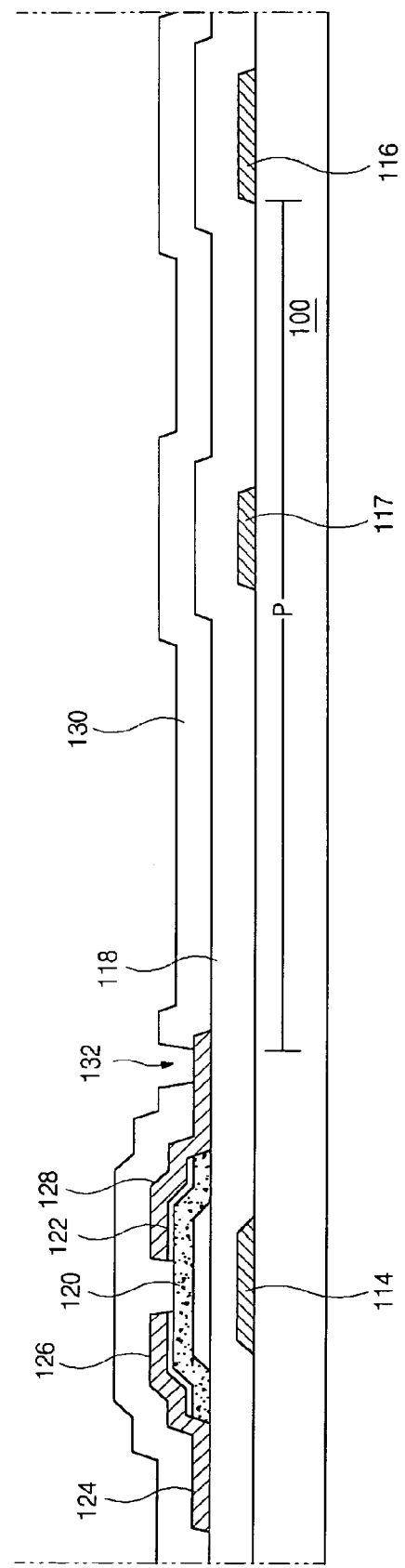

In FIG. 5D, a passivation layer 130 may be formed over an entire surface of the transparent substrate 100 to cover the source and drain electrodes 126 and 128 and the data line 124. The passivation layer 130 may include organic material, such as benzocyclobutene (BCB), or may include inorganic material, such as silicon nitride ($SiN_x$) or silicon oxide ($SiO_2$). Then, mask processes may be performed to form a drain contact hole 132 through the passivation layer 130, wherein a drain contact hole 132 may expose a portion of the drain electrode 128.

In FIG. 5E, a transparent conductive material, such as indium tin oxide (ITO) or indium zinc oxide (IZO), may be deposited on the passivation layer 130, and patterned using mask processes to form a first pixel-connecting line 134a, a second pixel-connecting line 134c, and the pixel electrodes 134b. The first pixel-connecting line 134a may be disposed above the common line 116 such that the first pixel-connecting line 134a and the common line 116 may constitute a storage capacitor $C_{ST}$ with the gate insulation layer 118 and the passivation layer 130 interposed therebetween. In addition, the second pixel-connecting line 134c may contact the drain electrode 128 through the drain contact hole 132. As shown in FIG. 4, the first pixel-connecting line 134a may be connected to the first end of each pixel electrode 134a, and the second pixel-connecting line 134c may be connected to the second end of each pixel electrode 134a.

Figure 5F:
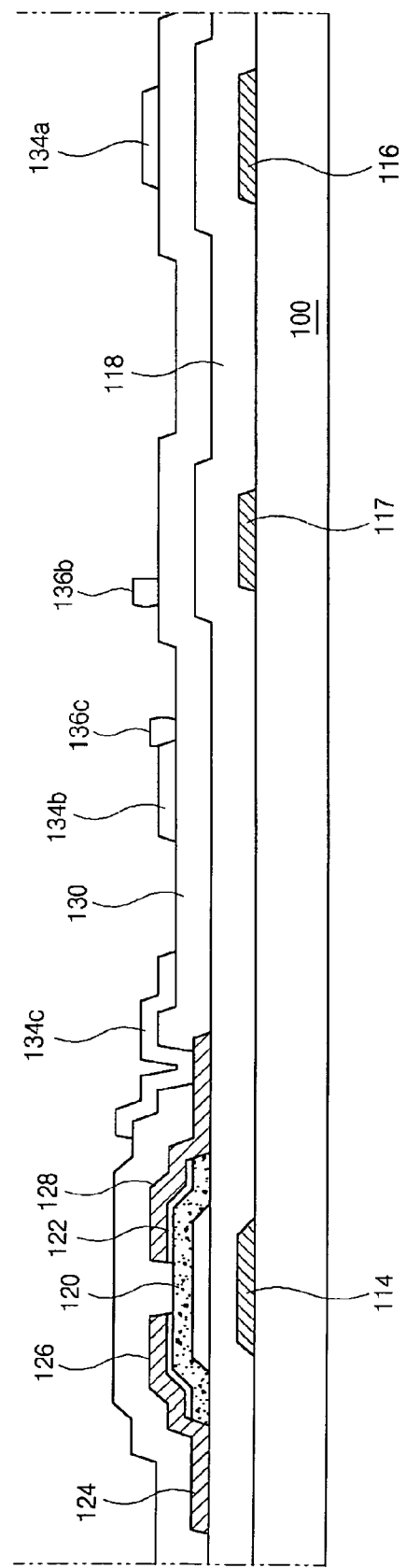

In FIG. 5F, an organic insulation material, such as a resin, may be formed on the passivation layer 130 to cover the first and second pixel connecting lines 134a and 134c and the pixel electrodes 134b. Then, the organic insulation material may be patterned to form the plurality of organic patterns 136a–136d. As shown in FIG. 4, the first and second organic patterns 136a and 136b may be formed on right and left areas of each common electrode 117, respectively, without contacting the common electrode 117. In addition, the second and third organic patterns 136c and 136d may be formed on right and left sides of each pixel electrode 134b, respectively, to contact the pixel electrode 134b. The first and second organic patterns 136a and 136b may be disposed in an alternating pattern along the pixel electrode 134b, and the third and fourth organic patterns 134c and 134d may also be disposed in an alternating pattern along the common electrode 117.

According to the present invention, the organic patterns may form symmetric electric fields between the pixel and common electrodes when the signals are supplied. Accordingly, the liquid crystals may be arranged symmetrically and multiple domains may be obtained within one pixel. Thus, the IPS-LCD device may not have the color shift phenomenon and the gray scale inversion, thereby obtaining a wide viewing angle and a high aperture ratio.

It will be apparent to those skilled in the art that various modifications and variation can be made in an array substrate for in-plane switching mode liquid crystal display device and a method of fabricating an array substrate for in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   a plurality of gate lines and data lines on a substrate;
   a plurality of thin film transistors, each thin film transistor disposed at a crossing of the gate and data lines and includes a gate electrode, an active layer, a source electrode, and a drain electrode;
   a plurality of common lines formed parallel with the gate lines on the substrate;
   a plurality of common electrodes linearly extending from each of the common lines into pixel regions;
   a plurality of pixel electrodes within each of the pixel regions, each of the pixel electrodes disposed between and parallel with the common electrodes;
   a first plurality of organic patterns formed along the common electrodes on opposing right and left sides of each of the common electrodes; and
   a second plurality of organic patterns formed along the pixel electrodes on opposing right and left sides of each of the pixel electrodes.

2. The array substrate according to claim 1, further comprising a plurality of first pixel connecting lines disposed above the common lines, each of the first pixel connecting lines connected with a first end of each pixel electrode.

3. The array substrate according to claim 2, wherein each of the first pixel connecting lines form a storage capacitor with a corresponding common line.

4. The array substrate according to claim 2, further comprising a plurality of second pixel connecting lines each contacting the drain electrodes through a drain contact hole, and each of the second pixel connecting lines connected with a second end of each pixel electrode.

5. The array substrate according to claim 1, wherein the first plurality of organic patterns correspond to the second plurality of organic patterns.

6. The array substrate according to claim 1, wherein the first and second pluralities of organic patterns are disposed in an alternating pattern.

7. The array substrate according to claim 1, wherein the first and second pluralities of organic patterns distort electric fields generated between the common and pixel electrodes when electric signals are supplied to the common and pixel electrodes.

8. The array substrate according to claim 7, wherein the distorted electric fields have a symmetrical distribution between the common and pixel electrodes.

9. A method of fabricating an array substrate for an in-plane switching liquid crystal display device, comprising:
   forming a plurality of gate lines and data lines on a substrate;
   forming a plurality of thin film transistors at crossings of the gate and data lines, each thin film transistor includes a gate electrode, an active layer, a source electrode, and a drain electrode;
   forming a plurality of common lines parallel with the gate lines on the substrate;
   forming a plurality of common electrodes to linearly extend from each of the common lines into pixel regions;
   forming a plurality of pixel electrodes within each of the pixel regions, each of the pixel electrodes disposed between and parallel with the common electrodes;
   forming a first plurality of organic patterns along the common electrodes on opposing right and left sides of each of the common electrodes; and
   forming a second plurality of organic patterns along the pixel electrodes on opposing right and left sides of each of the pixel electrodes.

10. The method according to claim 9, further comprising forming a plurality of first pixel connecting lines above the common lines, each of the first pixel connecting lines connected with a first end of each pixel electrode.

11. The method according to claim 10, wherein each of the first pixel connecting lines form a storage capacitor with a corresponding common line.

12. The method according to claim 10, further comprising forming a plurality of second pixel connecting lines, each contacting the drain electrodes through a drain contact hole, and each of the second pixel connecting lines connected with a second end of each pixel electrode.

13. The method according to claim 9, wherein the first plurality of organic patterns correspond to the second plurality of organic patterns.

14. The method according to claim 9, wherein the first and second pluralities of organic patterns are disposed in an alternating pattern.

15. The method according to claim 9, wherein the first and second pluralities of organic patterns distort electric fields generated between the common and pixel electrodes when electric signals are supplied to the common and pixel electrodes.

16. The method according to claim 15, wherein the distorted electric fields have a symmetrical distribution between the common and pixel electrodes.

* * * * *